United States Patent
Avery

(10) Patent No.: US 6,813,653 B2
(45) Date of Patent: Nov. 2, 2004

(54) METHOD AND APPARATUS FOR IMPLEMENTING PCI DMA SPECULATIVE PREFETCHING IN A MESSAGE PASSING QUEUE ORIENTED BUS SYSTEM

(75) Inventor: James M. Avery, Westford, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/616,375

(22) Filed: Jul. 9, 2003

(65) Prior Publication Data

US 2004/0015622 A1 Jan. 22, 2004

Related U.S. Application Data

(63) Continuation of application No. 09/713,917, filed on Nov. 16, 2000, now Pat. No. 6,611,883.

(51) Int. Cl.[7] .............................................. G06F 12/08
(52) U.S. Cl. ................................ 710/22; 710/5; 710/4; 709/212; 711/213
(58) Field of Search ............................... 710/22, 28, 4, 710/5, 52; 709/212; 711/169, 213

(56) References Cited

U.S. PATENT DOCUMENTS

| | | | |
|---|---|---|---|
| 5,828,901 A | | 10/1998 | O'Toole et al. |
| 6,012,106 A | | 1/2000 | Schumann et al. |
| 6,085,278 A | * | 7/2000 | Gates et al. ................ 710/263 |
| 6,108,692 A | | 8/2000 | Van Seters et al. |
| 6,324,597 B2 | | 11/2001 | Collier |
| 6,338,102 B1 | | 1/2002 | Garrett et al. |
| 6,594,712 B1 | * | 7/2003 | Pettey et al. .................. 710/22 |
| 6,658,521 B1 | * | 12/2003 | Biran et al. ................. 710/315 |

OTHER PUBLICATIONS

"Comparative I/O Analysis, InfiniBand Compared with PCI-X, Fiber Channel, Gigabit Ethernet, Storage over IP, HyperTransport, and RapidIO" White Papter, http://mellanox.com/technology/shared/IOcompare_WP_140.pdf, no date.*

* cited by examiner

Primary Examiner—Kim Huynh
(74) Attorney, Agent, or Firm—Kudirka & Jobse, LLP

(57) ABSTRACT

Speculative prefetching during DMA reads in a message-passing, queue-oriented bus system is controlled by creating a special data structure, called a "DMA scoreboard", for each work queue entry associated with a DMA read. The DMA scoreboard tracks the completion of DMA writes and reads by monitoring acknowledgements received from DMA writes and data tags received from DMA read responses. The DMA scoreboard also contains a section that indicates the current PCI address, and size and number of prefetches to be performed. After a DMA read has completed, the PCI current address is incremented to obtain a new PCI address for the first prefetch request. A new work queue entry is then created from the information in the DMA scoreboard to perform the prefetch. If the amount of data to be fetched exceeds the maximum amount of data that can be retrieved by a single read request, when the read request has been completed, the address stored in the DMA scoreboard is again incremented to create another address and another work queue entry is created. Operation continues in this manner until the number of prefetches specified in the DMA scoreboard have been performed.

30 Claims, 12 Drawing Sheets

FIG. 2 *(PRIOR ART)*

METHOD AND APPARATUS FOR IMPLEMENTING PCI DMA SPECULATIVE PREFETCHING IN A MESSAGE PASSING QUEUE ORIENTED BUS SYSTEM

RELATED APPLICATIONS

This application is a continuation of application Ser. No. 09/713,917 filed on Nov. 16, 2000, now U.S. Pat. No. 6,611,883, by James M. Avery and entitled METHOD AND APPARATUS FOR IMPLEMENTING PCI DMA SPECULATIVE PREFETCHING IN A MESSAGE PASSING QUEUE ORIENTED BUS SYSTEM. The following applications also contain subject matter that is related to the subject disclosed and claimed in the present application: application Ser. No. 09/713,919, now U.S. Pat. No. 6,704,831, entitled METHOD AND APPARATUS FOR CONVERTING ADDRESS INFORMATION BETWEEN PCI BUS PROTOCOL AND A MESSAGE-PASSING QUEUE-ORIENTED BUS PROTOCOL, filed by the present inventor on Nov. 16, 2000, and application Ser. No. 09/713,913, now U.S. Pat. No. 6,622,193, entitled METHOD AND APPARATUS FOR SYNCHRONIZING INTERRUPTS IN A MESSAGE-PASSING QUEUE-ORIENTED BUS SYSTEM, filed by the present inventor on Nov. 16, 2000.

FIELD OF THE INVENTION

This invention relates to methods and apparatus for providing speculative prefetching required by PCI devices during DMA reads with a message passing, queue-oriented bus system.

BACKGROUND OF THE INVENTION

In conventional computer systems, various components, such as CPUs, memory and peripheral devices, are interconnected by a common signal transfer path called a "bus". Busses are implemented in a variety of well-known standard architectures, one of which is called the PCI (Peripheral Component Interconnect) architecture. In its basic configuration, a PCI bus has a bus width of 32 or 64 bits, operating clock speeds of 33 or 66 MHz, and a data transfer speed of 132 MBps for 33 MHz operation and 566 MBps for 66 MHz operation. In accordance with PCI protocol, address and data are multiplexed so that address lines and data lines do not have to be separated. This multiplexing reduces both the number of signals required for operation and the number of connection pins required to connect PCI compatible devices to the bus. In the larger bus capability, there are 64 bus lines and, thus, 64 bits available for both address and data. PCI devices use a paged memory access scheme where each PCI address consists of a page number field and a page offset field and each PCI device can directly access a 4 GB address space.

PCI bus technology uses memory mapped techniques for performing I/O operations and DMA operations. In accordance with this technique, within the physical I/O address space of the platform, a range of addresses called a PCI memory address space is allocated for PCI devices. Within this address space there is a region reserved by the operating system for programmable I/O (PIO) operations that are performed by the host to read or change the contents of the device registers in the associated PCI devices. The host performs the read and write operations in the kernel virtual address space that is mapped into the host physical address space. Within the region, separate addresses are assigned to each register in each PCI device. Load and store operations can then be performed to these addresses to change or read the register contents.

A separate region is also allocated by the operating system for DMA access to host memory by the PCI devices. The allocated addresses are dynamically mapped to a section of the host physical memory. During this mapping, an address translation is performed to translate the addresses generated by the PCI devices into addresses in the host physical memory that may have a different address size that the PCI addresses. This address mapping is accomplished via a number of conventional mechanisms including translation lookaside buffers and memory management units.

The PCI device then uses the mapped addresses to perform DMA operations by directly reading and writing in with the mapped addresses in the PCI address space. The host may also access these memory locations by means of the kernel virtual address space that is mapped by another memory management unit into the host physical memory. Some PCI devices also use a technique called "speculative prefetching" in order to increase throughput during DMA reads. In accordance with this technique, after a DMA read is performed, one or more additional DMA reads are automatically performed to retrieve data which is located near the DMA data already retrieved on the theory that when useful data is retrieved, data located nearby will also be useful. The amount of data retrieved and the number of prefetches performed after each DMA read can generally be controlled by software. Details of the structure of the PCI bus architecture and of its operation are described in "PCI Local Bus Specification, Revision 2.2" (Copyright 1998) which publication is incorporated by reference herein in its entirety.

In addition to the PCI bus architecture, there are also other well-known bus architectures. For example, other architectures include Fibre Channel and more recently, Infini-Band[SM] architecture. These architectures are not memory-mapped architectures. Instead, the host and its memory are connected to host channel adapters. The input/output (I/O) devices are connected to target channel adapters. The host and target channel adapters communicate by messages comprising one or more data packets transmitted over serial point-to-point links established via a hardware switch fabric to which the host and target channel adapters are connected. The messages are enqueued for delivery between the channel adapters.

Data packet transmission is controlled by instructions generated by the host and I/O devices and placed in queues called work queues. Each work queue pair includes a send queue and a receive queue. The send queue can receive instructions from one process and the instructions cause data to be sent to another process. The receive queue can receive instructions which specify to a process where to place data received from another process. Hardware in the respective channel adapter processes instructions in the work queues and, under control of the instructions, causes the data packets to be transferred between the CPU memory and the I/O devices. A form of direct memory access (DMA) called remote direct memory access (RDMA) can also be performed by instructions placed in the work queues. This architecture has the advantage that it decouples the CPU memory from the I/O system and permits the system to be easily scaled.

As attractive as the newer bus architectures are, there are many existing PCI peripherals that will require accommodation in such architectures for a considerable period of time. Therefore, there exists a need for a mechanism to interconnect a PCI bus to the message-passing, queue-oriented architectures described above so that PCI peripherals can be used with the newer architecture. Such a mechanism is called a bridge and must meet certain criteria, such as the preservation of PCI ordering rules and address translation. In addition, PCI services must be implemented. For example, there must be a DMA mapping mechanism that allows the PCI devices to perform DMA operations. In addition, the aforementioned load/store operations must be accommodated. Other criteria, such as interrupt support must also be provided. It is also desirable to maximize the information transfer rate through such a bridge. However, the packetized data and instruction queues of the message-passing, queue-oriented architecture are not directly adaptable to meet the PCI memory mapped addressing requirements, and in particular, the speculative prefetching required by some peripherals.

Therefore, there is a need to accommodate speculative prefetching used by PCI peripherals in a computer system that uses a message-passing bus architecture and to perform the address mapping and translation that would conventionally be performed by an I/O memory management unit.

SUMMARY OF THE INVENTION

In accordance with the principles of the invention, speculative prefetching is controlled by creating a special data structure, called a "DMA scoreboard", for each work queue entry associated with a DMA read with prefetching enabled. The DMA scoreboard tracks the completion of DMA writes and reads by monitoring acknowledgements received from DMA writes and data tags received from DMA read responses. The DMA scoreboard also contains a section that indicates the current PCI address, and size and number of prefetches to be performed. After a DMA read has completed, the PCI current address is incremented to obtain a new PCI address for the first prefetch request. A new work queue entry is then created from the information in the DMA scoreboard to perform the prefetch. If the amount of data to be fetched exceeds the maximum amount of data that can be retrieved by a single read request, when the read request has been completed, the address stored in the DMA scoreboard is again incremented to create another address and another work queue entry is created. Operation continues in this manner until the number of prefetches specified in the DMA scoreboard has been performed.

BRIEF DESCRIPTION OF THE DRAWINGS

The above and further advantages of the invention may be better understood by referring to the following description in conjunction with the accompanying drawings in which.

DETAILED DESCRIPTION

Figure 1:
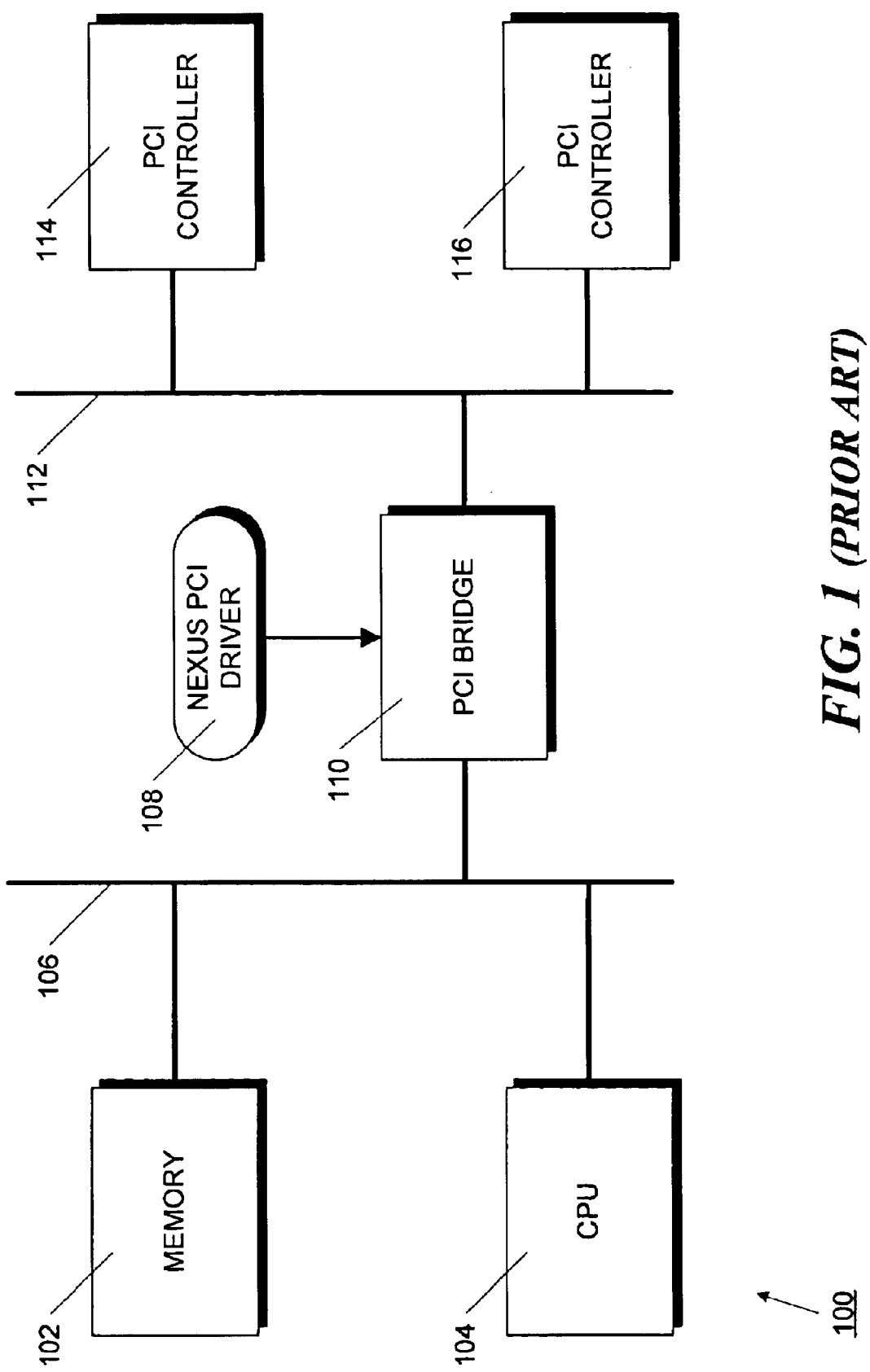
FIG. 1 is a block schematic diagram of a conventional computer platform illustrating the logical hardware topology including a PCI bus.

In the following description, the conventional PCI system will first be described followed by a description of the implementation of such a system in an InfiniBand$^{SM}$ architecture. A schematic block diagram illustrating the logical hardware topology of a prior art computer system including a PCI bus is shown in FIG. 1. As an example, a platform running the Solaris® operating system developed and sold by Sun Microsystems, Inc. is shown. However, those skilled in the art would realize that other platforms could also be used without departing from the spirit and scope of the invention. In accordance with its normal operation, the Solaris I/O framework builds an internal hierarchical data structure called a "device tree" consisting of a set of device nodes that are interconnected to form a tree that mimics the organization of the hardware viewed as interconnected buses and their attached devices. In FIG. 1, the computer system is represented as a memory interconnect bus 106 that is connected to PCI bus 112 by PCI bridge 110. The memory interconnect bus 106 has two devices, the CPU 104 and the memory 102. The PCI bus 112 also has two connected devices, PCI controller 114 and PCI controller 116.

In this model, a device node that represents a bus is bound to bus driver software called a "nexus" driver. Nexus driver software provides services to the Solaris operating system, which services include performing bus-specific device discovery, initializing devices, and translating physical addresses. Driver software is available commercially for a PCI bus from a number of companies. A nexus driver 108 is associated with the PCI bridge 110 as shown in FIG. 1.

Figure 2:
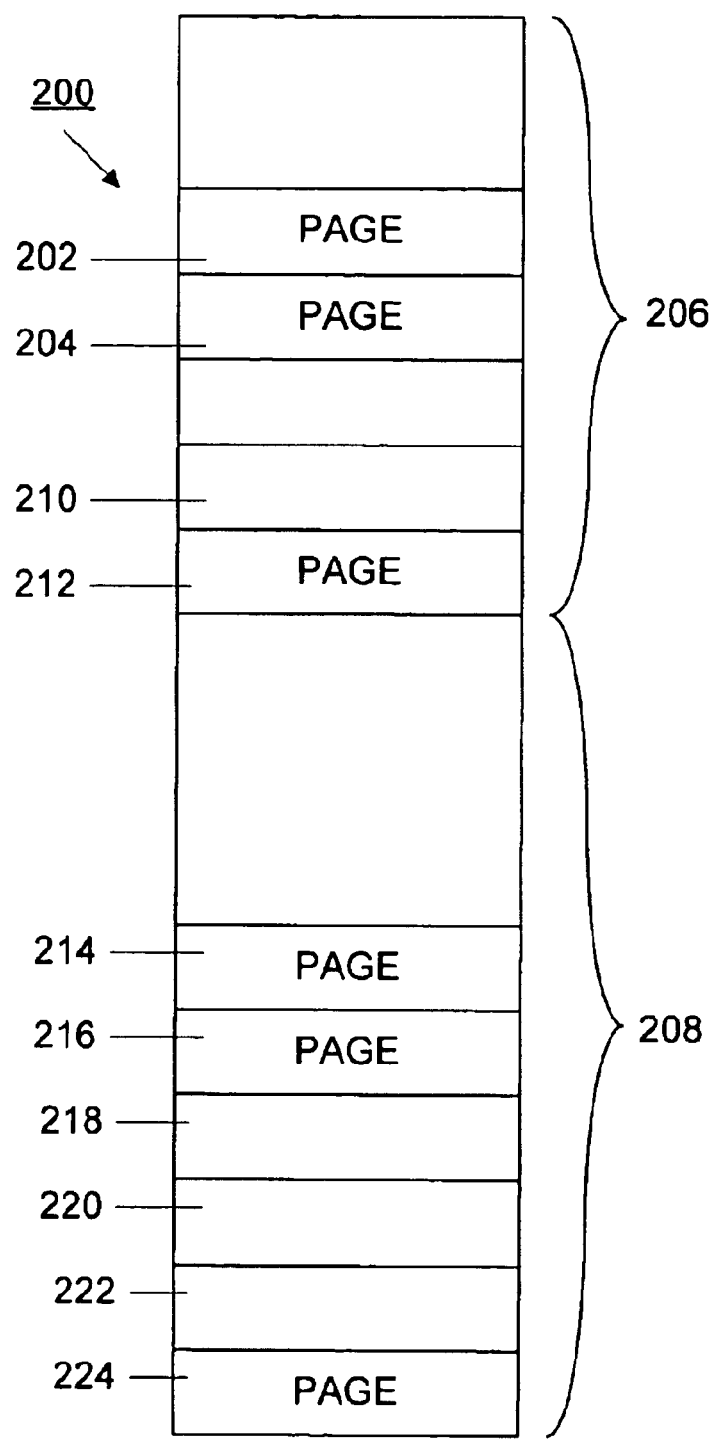
FIG. 2 is a block schematic diagram of a conventional memory mapping arrangement of a conventional PCI device.

FIG. 2 illustrates how a conventional PCI memory address space 200 is partitioned by the Solaris operating system within the space reserved for a single PCI bus 112 in a paged memory system. There is a region 206 reserved for programmed input/output (PIO) access from the host 104. This size of this region 206 is based on the sum of the memory requirements exported by the BARs of the individual devices 114 and 116 connected to that PCI bus 112. A similar allocation (not shown) may be built for PCI I/O space and PCI configuration (config) space for PIO accesses. The size of the region 206 is adjusted as devices are added and removed from the PCI bus 112.

There is a separate, non-overlapping region 208 within the PCI bus address space 200 reserved for mapping DMA accesses to host memory 102 from the PCI devices 114 and 116. On the illustrative platform, this range 208 of PCI addresses is mapped into host memory 102 through an I/O memory management unit (IOMMU.) The amount of memory in region 208 mapped at any given point in time is based on the DMA activity of the devices 114 and 116 on the PCI bus 112. If there are many I/O requests outstanding, a large DMA space will be allocated in this region 208.

In the illustrative system, there is no requirement that the PIO region 206 and the DMA region 208 be contiguous in PCI memory space 200 although they are illustrated this way in FIG. 2. The PIO and DMA regions, 206 and 208, never share the same page, so each region is always a multiple of the host page size. Furthermore, the PCI memory allocation algorithm reserves space for each device such that no two devices share the same page in the PIO region 206 and the DMA region 208. For example, pages 202 and 204 in the PIO region 206 might be assigned to a PCI device A, whereas pages 210 and 212 may be assigned to device B. Similarly, Pages 214–218 in the DMA region 208 might be assigned to PCI device A and pages 220–224 assigned to device B.

For load and store operations, depending on the platform, the operating system may issue appropriate processor instructions to access the PCI address space. On other platforms, the processor uses addresses in a kernel virtual address space. These addresses are mapped into a physical address space in the platform memory by a memory management unit. Similarly, processor-generated load/store operations are decoded by the PCI bridge controller mapped into the appropriate PCI cycles based on the address region.

For DMA operations, the exact address translation mechanism depends on the platform. For example, on Sun platforms, the PCI bridge hardware 110 supports a I/O memory management unit (IOMMU) that translates a PCI address generated by the PCI device into a host memory physical address. Another memory management unit translates the kernel virtual address space into the host physical memory addresses.

The PCI address consists of two fields: page number and page offset. Page offset stays the same from PCI address to host memory physical address. In systems where the address size differs from the PCI address size an address translation must be performed. For example, in Sun system mentioned above uses a 41-bit physical address size. Consequently, the 32-bit address size generated by the PCI devices must be converted or resolved to generate the physical address. The conversion of the PCI address is carried out by the IOMMU, which may use a conventional translation lookaside buffer to accelerate the conversion. In addition, a DMA region allocated to a particular device may have special properties called consistent and streaming mode. Other platforms don't support any indirect mapping and rely on PCI devices to support scatter/gather DMA operation.

Figure 3:
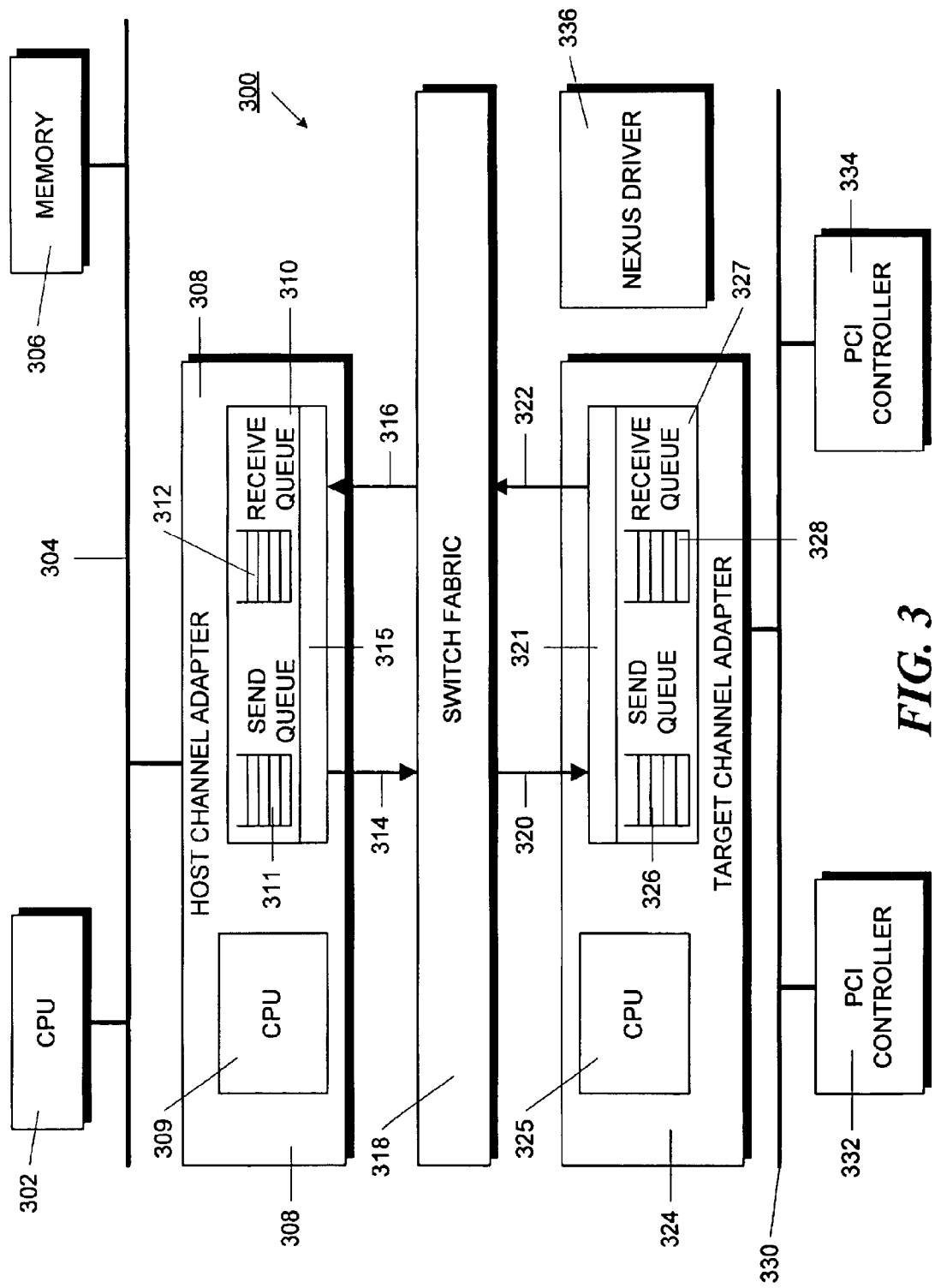
FIG. 3 is a block schematic diagram of an InfiniBand$^{SM}$ bus architecture showing the work queue pairs that are used to send and receive messages.

FIG. 3 illustrates, in block schematic form, a message passing queue-oriented bus architecture with an attached PCI bus. In this figure and the discussion that follows, the InfiniBand$^{SM}$ architecture is used as an illustration of such a system. However, it will be apparent to those skilled in the art that the principles of the invention are applicable to other similar systems that use the same message-passing, queue-oriented architecture. The InfiniBand$^{SM}$ system 300 shown in FIG. 3 has a memory interconnect bus 304 that connects CPU 302 and memory 306. The memory interconnect bus 304 is, in turn, connected to a host channel adapter (HCA) 308 that includes its own CPU 309 and memory 311. Other HCAs (not shown) may also exist in a conventional InfiniBand$^{SM}$ system, but have been omitted for clarity. In general, the HCA 308 communicates with the memory 306 by means of physical memory addresses. In order to permit operation with virtual memory addresses, the HCA 308 maintains a Translation and Protection Table (TPT) that it uses to translate virtual addresses to physical addresses and to validate access rights to the memory 306.

The HCA 308 is connected to a switch fabric 318 for both sending and receiving data as indicated schematically by arrows 314 and 316. The HCA 308 can be connected to any number of peripheral busses via the switch fabric 318. In particular, the HCA 308 can be connected to various PCI peripherals, of which two, 332 and 334 are shown, via a PCI bus 330, by means of a target channel adapter (TCA) 324. In this case, the TCA 324 is an InfiniBand to PCI bridge (IB-PCI Bridge) and can both send and receive data as indicated schematically by arrows 320 and 322. The TCA 324 also includes a CPU 325 and a memory 327. Other TCAs (not shown) may also be present.

Clients of both the HCA 308 and the TCA 324 can control data transfer by creating a facility called a work queue. Each client has its own set of work queues, comprising one or more work queues, and each pair of work queues is independent from the other work queues. Work queues are always created in pairs; one for send operations and one for receive operations. In general, the send work queue holds instructions that cause data to be transferred between a client's memory and another process's memory, and the receive work queue holds instructions that instruct the client where to place data that is received from another process. For example, HCA 308 has a work queue pair consisting of send queue 310 and receive queue 312. Similarly, TCA 324 has a work queue pair consisting of send queue 326 and receive queue 328. Although only two queue pairs are shown, typically each client would create many more work queue pairs in order to conduct its operation. In order to use the work queue pair, a client submits a work request to its respective channel adapter and the work request causes an instruction called a Work Queue Entry (WQE) to be placed on the appropriate send work queue.

There are several classes of send queue operations, including SEND operations and RDMA operations. For a SEND operation, the WQE specifies a block of data in the client's memory space for the hardware to send to the destination. At the destination, a corresponding already-queued receive WQE in a receive queue specifies where to place that data. For an RDMA operation, the WQE specifies a block of data to be sent and specifies the address at the destination where the data is to be placed. Thus, an RDMA operation does not need to involve the receive work queue of the destination.

RDMA operations include RDMA-WRITE and RDMA-READ. The RDMA-WRITE operation stipulates that the hardware is to transfer data from the client's memory to the remote process's memory. The RDMA-READ operation stipulates that the hardware is to transfer data from the remote memory to the client's memory.

Both the host and channel adapter hardware comprise a transport engine that executes WQEs in the order that they were placed on the send work queue. For example, host channel adapter 308 includes transport engine 315 and target channel adapter 324 includes transport engine 321. In the process of sending data, the transport engine in the source channel adapter interprets the WQE in its send queue and creates a request message, which includes the data, to send to the destination channel adapter. The transport engine segments the message into multiple packets if necessary, adds the appropriate routing headers, and sends the packets out.

When the destination receives a packet, its transport engine associates the received packet with a particular work queue pair and uses the context of that work queue pair to process the packet and execute the operation. If necessary, the destination transport engine creates an acknowledgment message and sends that message back to the source channel adapter.

The structure and operation of the InfiniBand$^{SM}$ system are described in detail in the InfiniBand$^{SM}$ Specification Rev 0.9, The InfiniBand$^{SM}$ Trade Association (2000) which specification is incorporated by reference herein in its entirety.

A nexus driver 336 written for the IB-PCI bridge 324 has procedures that map operating system functions into Infini-Band$^{SM}$ operations. In particular, as discussed in detail below, PCI device DMA read/write operations are implemented as InfiniBand RDMA-READ/RDMA-WRITE operations. The IB-PCI nexus driver 336 is similar to that used for other InfiniBand devices. Specifically, the conventional InfiniBand device configuration framework will discover the IB-PCI bridge device 324 using Device Management Class MADs.

The IB-PCI bridge 324 exports enough information, such as service IDs for configuration, hotplug, and memory mapping, to enable the operating system InfiniBand$^{SM}$ device framework to create a device node as discussed above and to bind the appropriate device driver. In particular, the IB-PCI nexus driver 336 must discover the service ID for communication with the IB-PCI bridge 324 and the number of queue pairs necessary to support DMA transfers, as discussed below. This latter number may vary because each queue pair may map to one or more pages and queue pairs may be allocated for feature support such as pre-fetching capability and service IDs needed to access IB-PCI bridge resources. In any case, the IB-PCI nexus driver 336 uses the information obtained from the device 336 to determine the number of queue pairs assigned. The nexus driver allocates ranges of PCI memory and I/O space. The location of the PCI devices in configuration space may be set by the IB-PCI bridge hardware 324 or be made programmable so that the nexus driver may setup the bus, via configuration operations.

Since the PCI address space and the kernel virtual address space are not directly linked, the IB-PCI nexus driver does not reserve any kernel address space for PCI operations. Instead, during initialization, the nexus driver 336 will create a queue pair, called a command queue pair, and establish a connection for sending control messages from the host CPU 302 to the IB-PCI bridge 324. These control messages enable device-specific message transfer for establishing initial setup using the aforementioned information obtained from the IB-PCI bridge 324.

Figure 4:
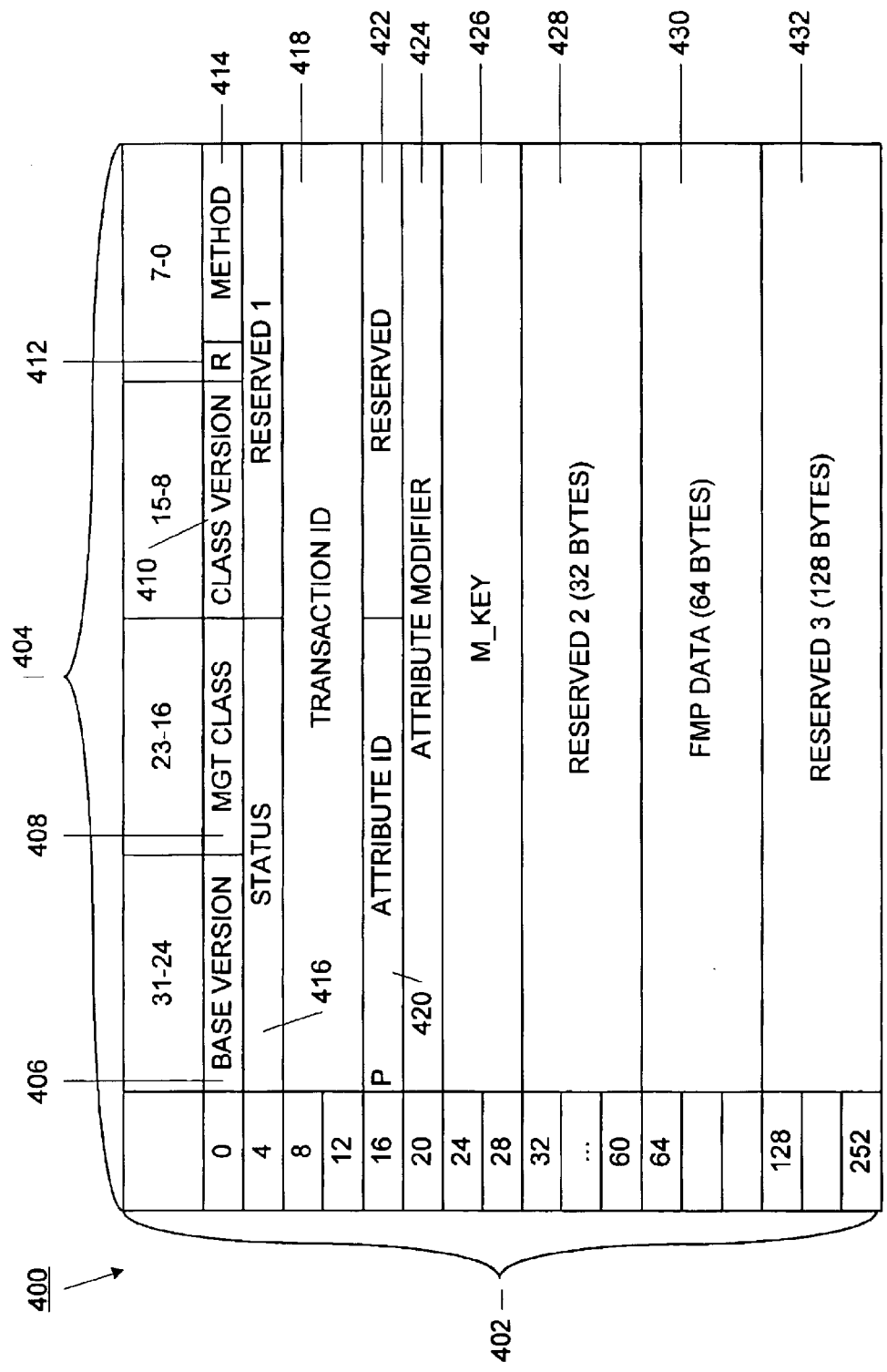
FIG. 4 is a schematic diagram of a data packet used to send information over the InfiniBand$^{SM}$ bus.

An InfiniBand data packet is used to send requests to the IB-PCI bridge 324 and to access the remote address space of a target PCI device. A general format of this data packet is shown in FIG. 4. The packet 400 consists of 253 32-bit words 402. In FIG. 4, the bits 404 in each of the words 402 are shown across the top of FIG. 4. Each word consists of four bytes. The first word consists of five sections: a one-byte base version identifier 406, a one-byte management class identifier 408, a one-byte class version identifier 410, a reserved bit 412 and a method identifier 414, which together comprise the last byte. The second word comprises a two-byte status code. The remainder of the second word comprises an area 417 reserved for future use (Reserved 1). The next two words are composed of an eight-byte transaction ID 418.

Following the transaction ID 418 is a word that consists of a two-byte attribute ID 420 and a reserved area 422. Next, a four-byte attribute modifier area 424 is contained in the data packet 400. The attribute modifier 424 is followed by an eight-byte M-key 426 that, in turn, is followed by a 32-byte reserved area 428. Next, an FMP data area 430 of 64 bytes is included. The last 128 bytes 432 of the data packet 400 are reserved.

Figure 5:
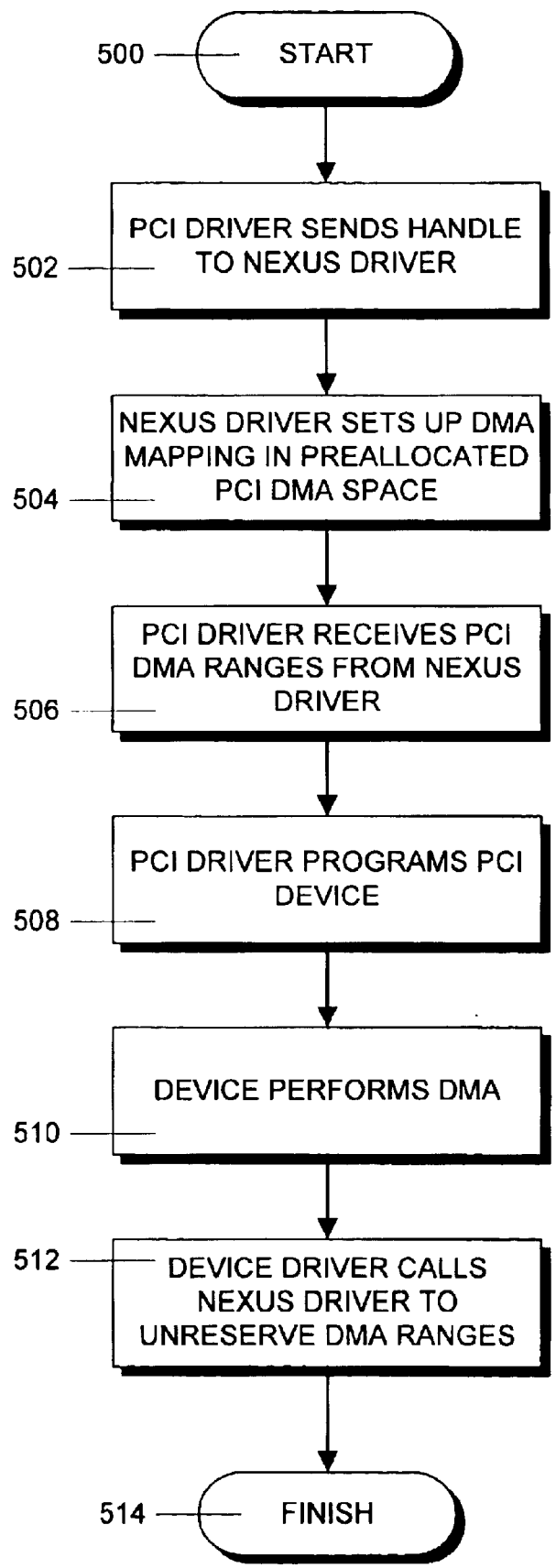
FIG. 5 is a flowchart illustrating steps performed by software during a PCI DMA transfer using an InfiniBand RDMA operation.

FIG. 5 shows an overall view of a DMA data transfer process implemented in a message-passing, queue-oriented system such as that shown in FIG. 3. Before the actual transfer can take place, the nexus driver associated with the InfiniBand-PCI bridge will allocate an area of PCI address space for DMA operations in both the InfiniBand-PCI bridge and a translation protection table (TPT) in the host channel adapter. The TPT is used to translate the PCI addresses into the physical addresses used to access the memory 306. The nexus driver 324 may allocate one large chunk of memory to the PCI address map, or the nexus driver may allocate memory piecemeal as more space is needed by PCI devices attached to the bridge 324. Along with specifying the size of each memory chunk, that region will further be described by whether it needs to support pre-fetching for RDMA reads from the device and will be assigned a corresponding R-Key that is used in the DMA operation described below.

The DMA process starts in step 500 and proceeds to step 502 where the PCI driver sends a request containing a "handle" to the nexus driver. The handle contains information which the nexus driver uses to setup DMA mapping ranges in the allocated PCI DMA space as noted in step 504. The DMA mappings for each device are setup so that no two devices share the same page mapping into memory. Next, in step 506, the nexus driver sends the DMA address ranges to the PCI driver and, in step 508, the PCI driver uses the PCI DMA ranges returned by the nexus driver to program one of the PCI devices for the DMA transfer.

The device performs the DMA transfer in step 510. A queue pair may be allocated in the InfiniBand-PCI bridge to support the DMA stream into memory. The DMA transfer is conducted, as described below, as a series of InfiniBand RDMA reads or writes. In step 512, the device driver releases the DMA mappings by calling the nexus driver to unreserve the range in the PCI DMA map allocated for that device. The process then terminates in step 514.

Figure 6A:
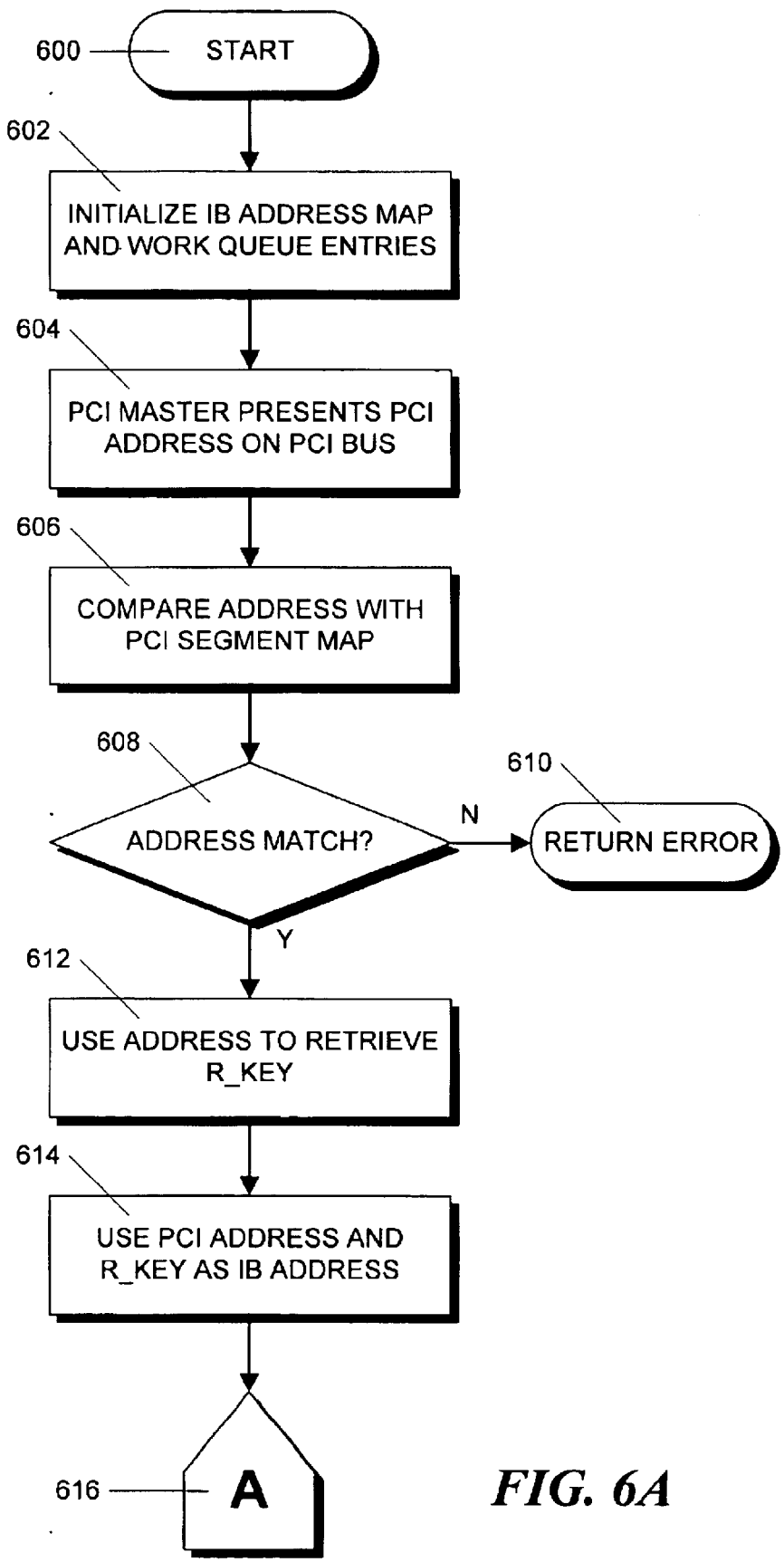
FIGS. 6A and 6B, when placed together, form a flowchart illustrating the implementation of a DMA transfer, including a prefetch operation using work queue entries to perform an InfiniBand RDMA operation.
Figure 6B:
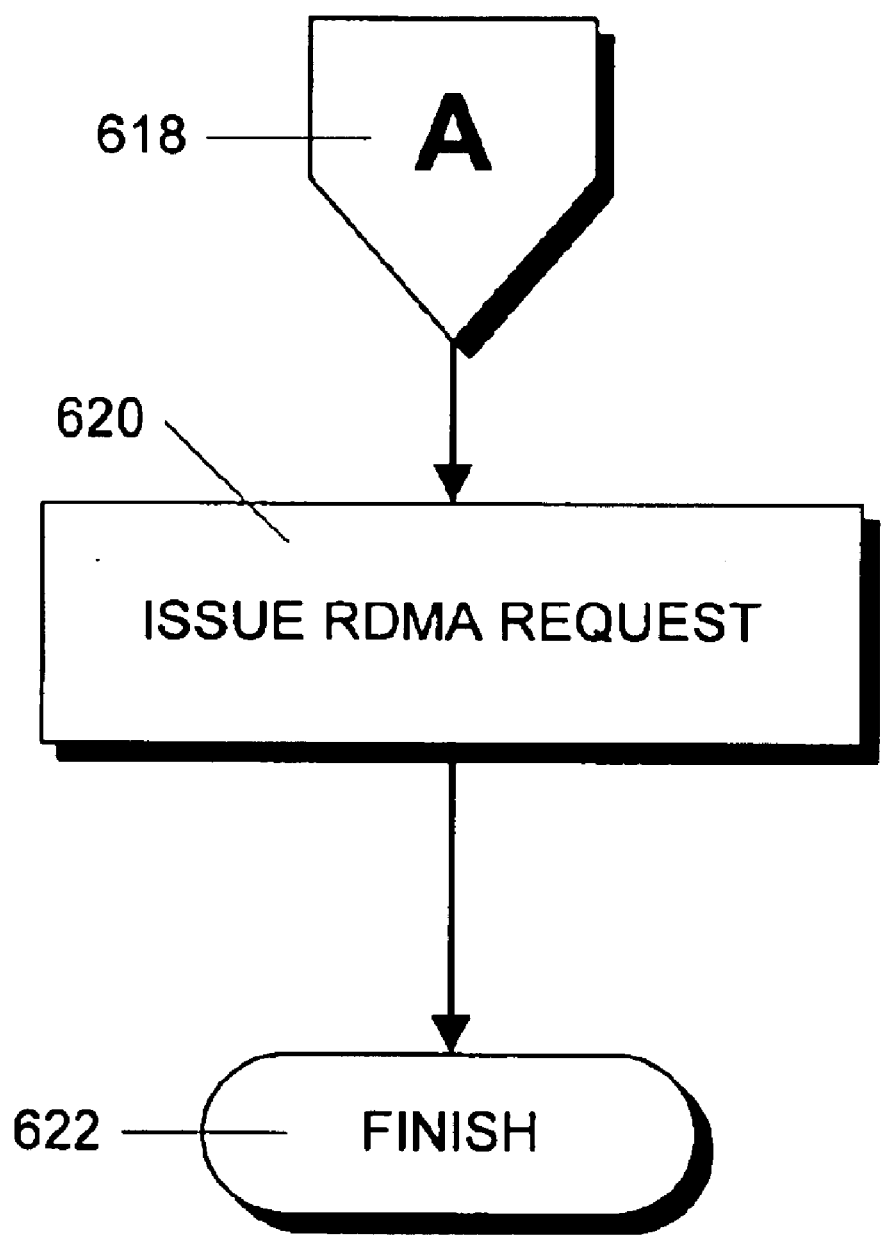
Figure 7:
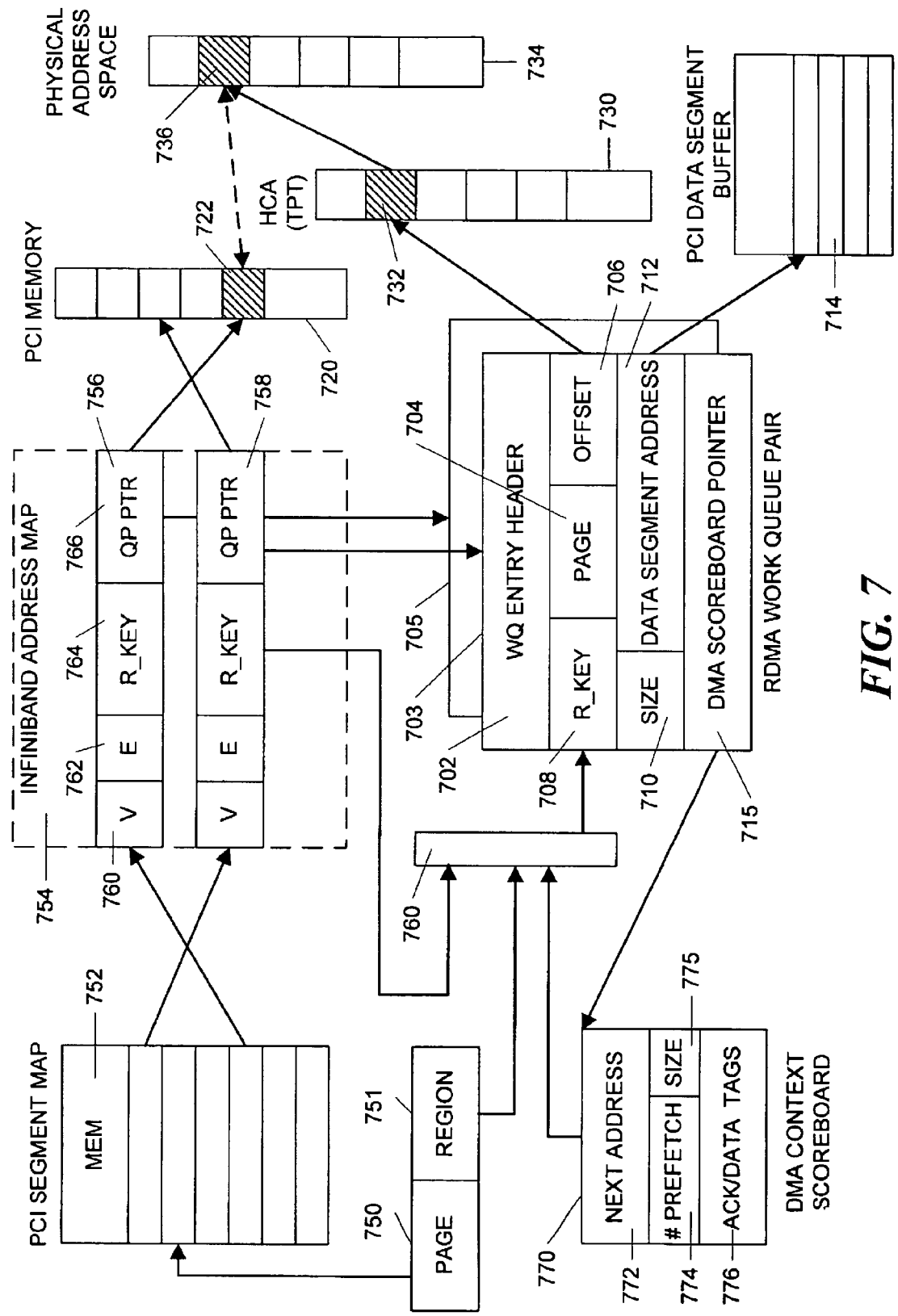
FIG. 7 is a block schematic diagram illustrating the use of work queue entries to reference a particular region of PCI device address space for an RDMA operation.

Mapping of the PCI device address space into InfiniBand address space usable for InfiniBand transit is accomplished using work queue pairs and work queue entries as illustrated in FIGS. 6A, 6B and 7. The InfiniBand address space then is mapped into the system virtual address space by the host channel adapter.

Figure 8A:
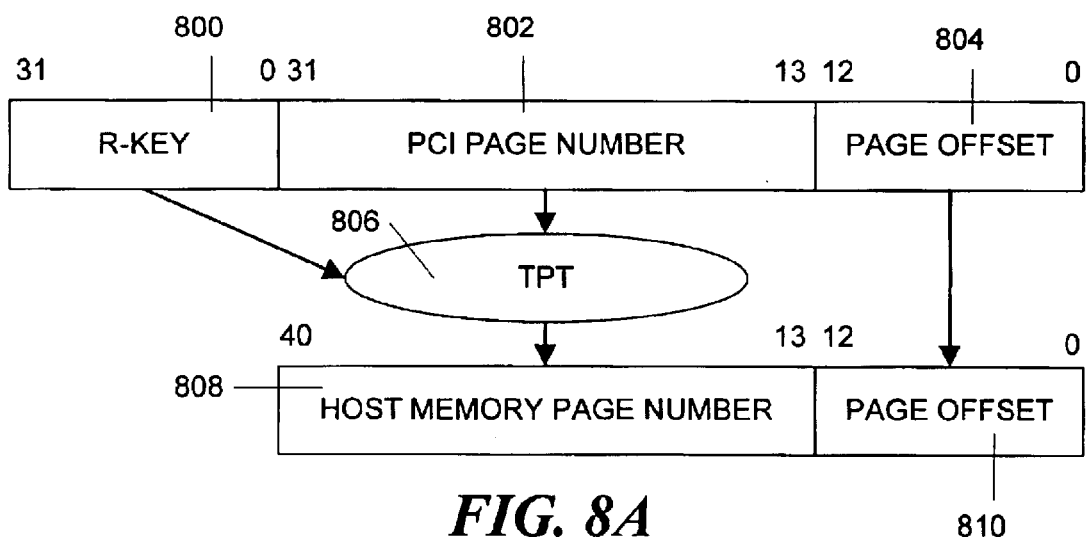
FIG. 8A is a schematic illustration of a mapping between the PCI address space and the host virtual memory space.
Figure 8B:
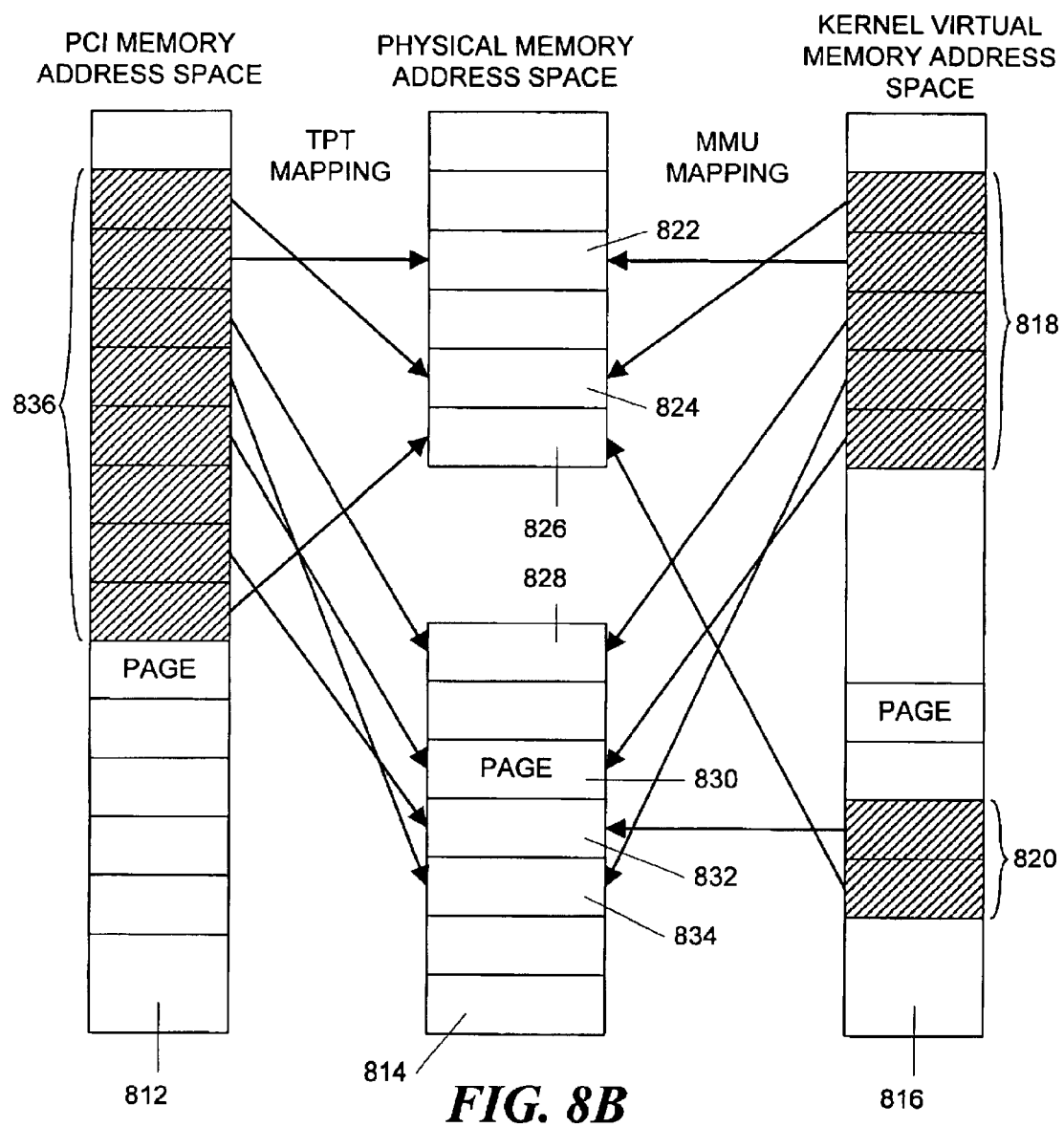
FIG. 8B is a schematic diagram illustrating how a PCI memory address referenced in the kernel memory address space is translated into a physical storage location and how the same address in the PCI memory address space is translated into the physical storage location by the translation and protection table.

FIGS. 6A and 6B, when placed together, form a flowchart illustrating details of the DMA process without prefetching enabled. FIG. 7 illustrates the process schematically as implemented with InfiniBand work queues. FIGS. 8A and 8B, when placed together, form a flowchart illustrating details of the DMA process with prefetching enabled. The process starts in step 600 and proceeds to step 602 in which work queue entries 700 and an InfiniBand address map 754 are initialized with the desired addresses and data segments to reflect the DMA address space and pointers to the data segment buffers 714.

The InfiniBand address map 754 is used to associate work queue entries, such as entries 703 and 705 with regions in the PCI address space 720. The InfiniBand address map 754 is a data structure that is stored locally in the InfiniBand-PCI bridge 324 and has a plurality of entries of which entries 756 and 758 are shown. Each entry is associated with a region in the PCI address space 720 and holds the initial segment address for each region that is mapped into the system virtual memory address space, through the host channel adapter TPT.

Each table entry, such as entry 756 has a valid flag 760 and an error flag 762. Flags 760 and 762 mark entry 756 as either valid or in error. If the error flag 762 is set, it means an error was returned because the entry 756 did not map correctly into the TPT entry in the host channel adapter. Each address map entry 756 also includes a pointer 766 to the work queue assigned to the address space mapping. One entry is required for each virtual memory address region that will be referenced by PCI devices and every work queue needs an entry in map 754. Each entry, such as entry 756 also includes an R-Key 764 that references the memory region used in specifying the limits of the address range defined for this virtual memory address space mapping and TPT address translation.

The address map defines a translation between the PCI address and a physical memory address to which that PCI address is mapped. This mapping is illustrated in FIGS. 8A and 8B. As shown in FIG. 8A, a 32-bit PCI address is translated into a 40-bit host virtual memory address by the translation and protection table mechanism. In particular, the PCI address is comprised of a 13-bit page offset 804 and a 19-bit PCI page number 802. The 13-bit PCI page offset 804 is used as the host memory page offset 810 as shown in FIG. 8A. The host page number is generated using the PCI page number 802 and the translation and protection table 806. The translation and protection table 806 receives as inputs the PCI page number 802 and a 32-bit Remote Key or R-Key which is used by the HCA to select appropriate page tables for translating virtual memory addresses to physical memory addresses. This R-Key is assigned at the time the nexus driver reserves memory space for the PCI PIO operations. The R-Key 800 and the PCI page number are used by the translation and protection table 802 to generate the host memory page number 808.

The results of this translation are illustrated in FIG. 8B which shows the relationship of the PCI memory address space 812, the physical memory address space 814 and the kernel virtual memory address space 816. For example, five contiguous pages 818 and two contiguous pages 820 in the kernel memory space 816 are mapped to pages 822-834 in the physical memory address space 814 by a conventional memory management unit (not shown.) Note that the pages 818 and 820 are contiguous, the pages 822-834 in the physical memory address space 814 may, or may not be contiguous. In a similar manner, contiguous pages 836 in the PCI memory address space 812 are mapped by the aforementioned TPT mapping mechanism into the same physical memory address space pages 822-834.

A particular work queue entry 703 is identified by a queue pair pointer in an address map entry, such as entry 758. The work queue entry 703 includes a conventional header 702 and an embedded address including an R-Key 708, a page ID 704 and a region ID 706. The work queue entry 703 also contains a size variable 710 that indicates the size of the data transfer and a pointer 712 to a buffer location 714 where PCI data segments are stored. In the case of a DMA write, the data segments are placed into the buffer 714 by the PCI device. In the case of a DMA read, the data buffer 714 is a location where data retrieved during the read operation will be placed.

The work queue entry 703 also contains a pointer 715 to a DMA context scoreboard 770. The DMA scoreboard 770 is a data structure that holds the DMA context and tracks outstanding DMA requests to insure that all outstanding requests are completed. The DMA scoreboard 770 contains data tags 774 to track data returning from outstanding DMA read requests and ACK flags which track whether DMA writes have been completed. In accordance with the principles of the invention, the DMA scoreboard 770 also contains a prefetch section that includes the number of prefetches 776 and a size section 775. As previously mentioned, the number of prefetches and the size of each prefetch may be changed by programming. This section of the DMA scoreboard 770 controls speculative prefetching carried out during DMA reads as discussed below in connection with FIGS. 9A and 9B.

Returning to the DMA process outlined in FIGS. 6A and 6B, in step 604, a PCI master device presents a PCI address on the PCI bus in preparation for a DMA read or write transfer. The PCI address consists of a page ID 750 and a region ID 751. The PCI DMA transaction is claimed on the PCI bus and the page ID 750 is presented to a PCI segment map 752 and compared to the entries in step 606. The entries in map 752 represent pre-programmed address ranges corresponding to regions in the PCI memory address space. If the PCI page address matches a valid PCI base address range in the PCI segment map 752, in step 608, the segment map 753 maps the PCI address to an entry in the InfiniBand address map 754. In particular, the address map 752 returns a pointer to a work queue pair that contains the data segment size that will be used in the DMA transfer.

For example, the selected entry 758 in address map 754 might be associated with an RDMA work queue pair, such as work queue pair 700. A work queue entry, such as entry 703, is created in that queue for processing the RDMA request. Alternatively, if, in step 608, no matching address range is found, the process terminates with an error in step 610.

If a matching address is found in step 608, the process proceeds to step 612 where the R-Key for the selected region is obtained from the InfiniBand address map entry 758. In step 614, the R-Key 708 and PCI address (page ID 704 and offset 706) are combined to form the InfiniBand address as indicated schematically by box 760. In a preferred embodiment, the InfiniBand address could be created by forming a concatenation with the R-Key 708 in the upper 32 bits and the PCI address in the lower 32 bits. Alternatively, the upper 32 address bits of the InfiniBand address could contain implementation-specific information as long as the lower 32 bits contain the PCI address. In any case, the combined address is pushed into the entry 703 to begin the transfer. The process then proceeds, via off-page connectors 616 and 618, to step 620 where an RDMA request is issued. If a DMA read has been requested, at this point, buffer space 714 must be allocated in the bridge to hold the returning data.

If the DMA operation requests transfer of a data block that is larger than the maximum allowed data packet size, then several data packets must be issued to complete the data transfer. These multiple packets are handled by the conventional InfiniBand$^{SM}$ system. Once the transfer has reached the size 710 specified in the work queue entry 703, the transfer stops in step 622. The tracking section 776 in the DMA scoreboard data structure 770 is then used to insure that data is returned from a read request by tracking the data tags associated with each data packet. Alternatively, the returning acknowledgements from a DMA write request are tracked using the tracking section 776.

Figure 9A:
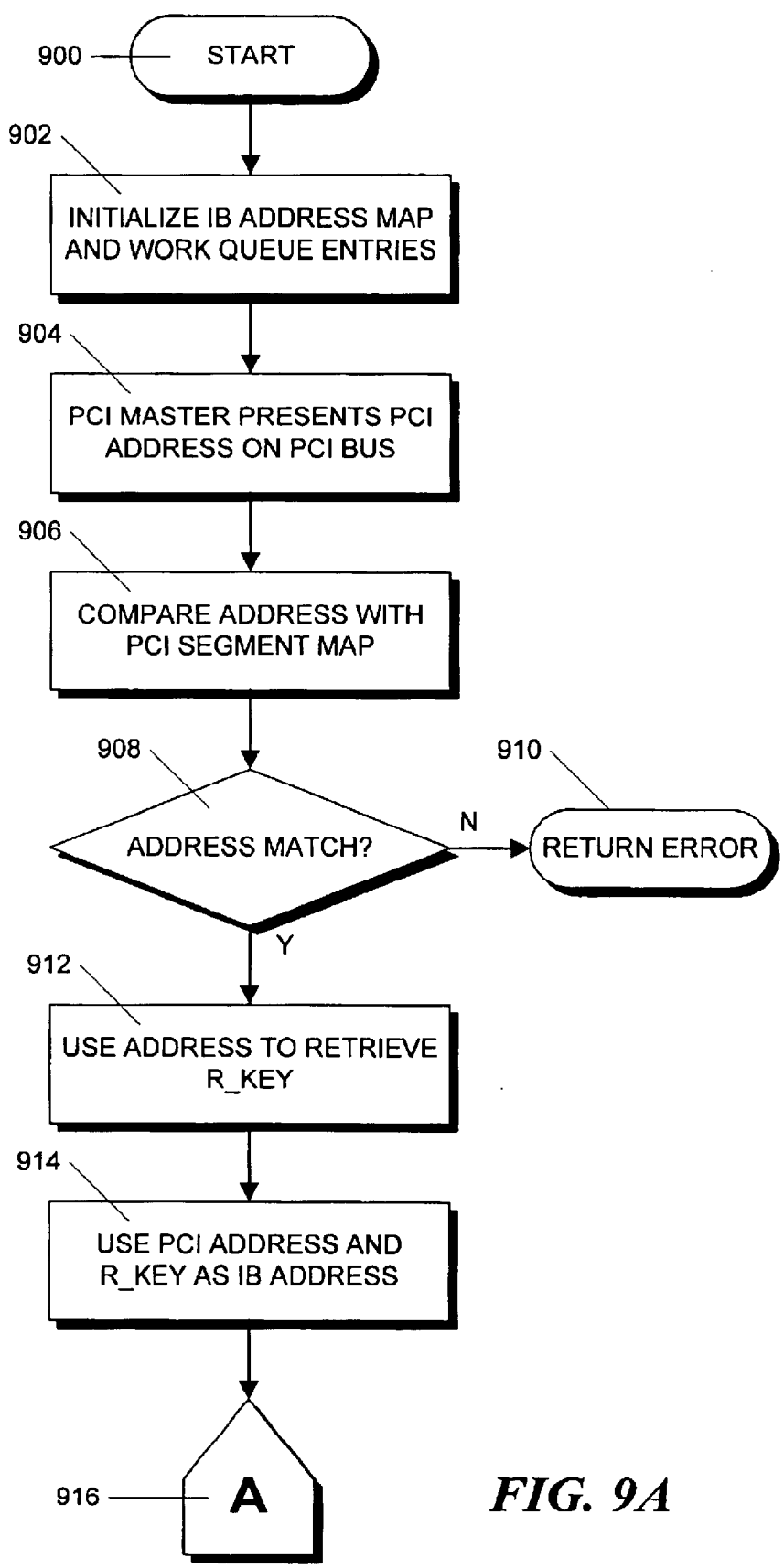
FIGS. 9A and 9B, when placed together, form a flowchart illustrating the implementation of a DMA read, with prefetching enabled, using the work queue entries illustrated in FIG. 7 and a DMA scoreboard.
Figure 9B:
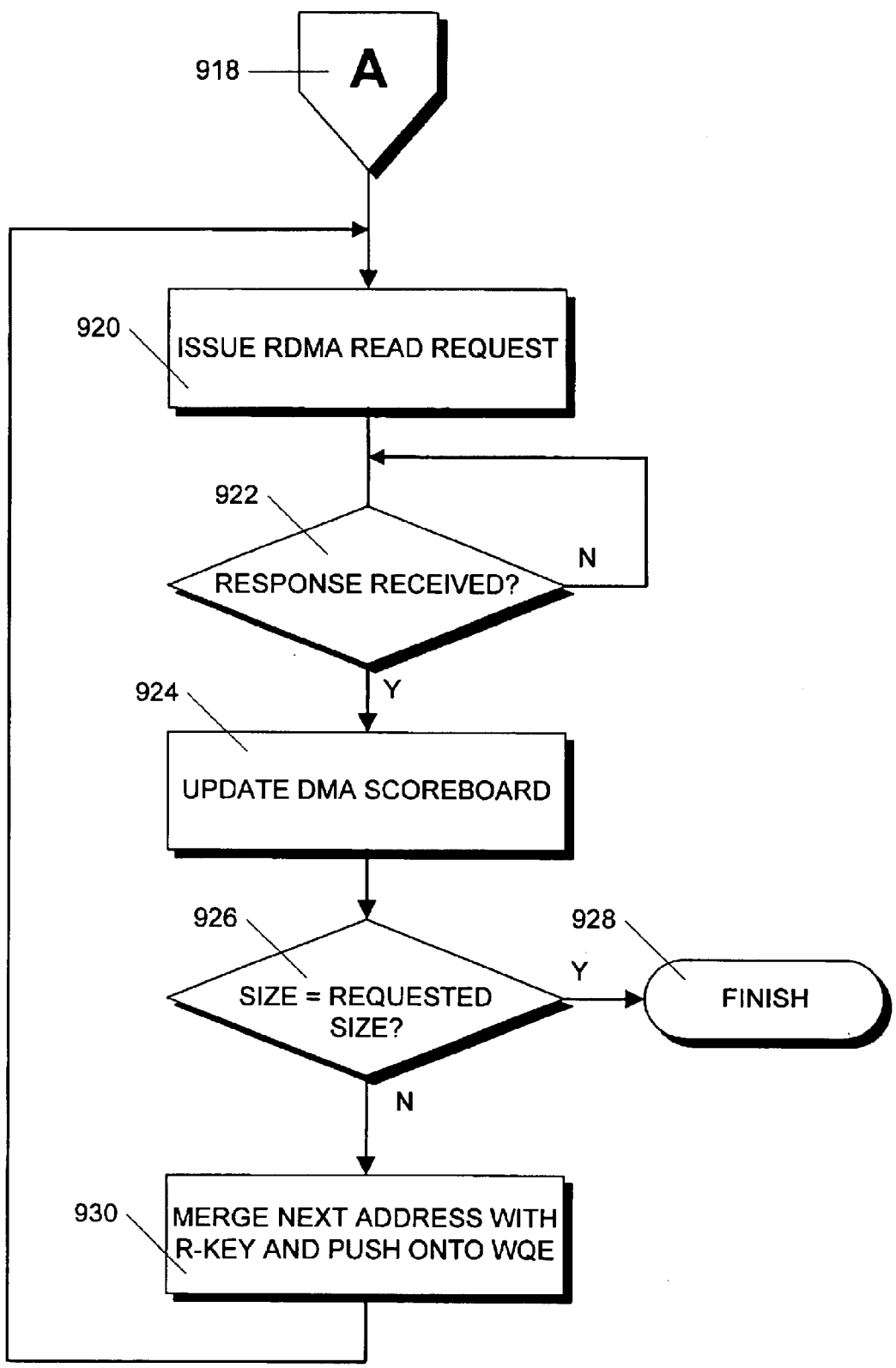

In the DMA process outlined in FIGS. 9A and 9B, prefetching has been enabled. In this flowchart, steps 900–918 correspond to steps 600–618 in FIGS. 6A and 6B and the corresponding description applies. In step 920 the initial DMA read request is issued, however, prefetching will require additional read requests to be generated. Since these requests are acted on asynchronously by the InfiniBand^SM bus system, they must be coordinated by the DMA context scoreboard 770 which stores the number and size of additional read requests that must be made in fields 774 and 775, respectively.

In particular, when an RDMA read request is issued corresponding to work queue entry 703, the DMA context is stored in DMA context scoreboard 770 which is referenced from entry 703 by pointer 715. A tag that uniquely identifies the request is stored in field 774. For example, this identifier might be the transaction ID 418 in the PCI data packet, a packet sequence number, or some similar identifier. The data transfer software then monitors, in step 922, the returning data packets until a response packet corresponding to the outstanding request is received. The response packet can be examined to determine whether it corresponds to the initial read request.

A prefetch is performed using the same work queue pair that was used to perform the initial DMA read. When a response packet is received from the initial DMA read request, the process then proceeds to step 924 where the DMA scoreboard is updated by adding the prefetch size stored in field 774 to the current address and storing the result in next address field 772. A check is then made in step 926 to determine whether the DMA transfer size is equal to the work queue entry size request 710. If the sizes are equal, the process finishes in step 928.

If prefetch data remains to be retrieved, the next prefetch request is initiated in step 930 by combining the next address in DMA scoreboard field 772 with the R-Key 764 in the address map 754 as schematically indicated by block 760 to produce a new virtual address which is pushed into work queue entry 703. The process then returns to step 920 in which the new prefetch read request is generated. Operation continues in this manner until the size 710 in the work queue entry 703 is exhausted as determined in step 926 or, alternatively, until internal buffer resources are consumed.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the work queue entries. Other aspects, such as the specific process flow, as well as other modifications to the inventive concept are intended to be covered by the appended claims.

What is claimed is:

1. Apparatus for performing speculative prefetching for a PCI DMA read request in a PCI-InfiniBand bridge system, the apparatus comprising:
   an update mechanism responsive to data returning from an initial InfiniBand RDMA request issued to satisfy the PCI DMA read request for computing a next address from the read address of the initial InfiniBand RDMA request; and
   a repeat mechanism that generates a new RDMA read request using the next address to perform a speculative prefetch.

2. The apparatus of claim 1 wherein the next address is computed from information defining a prefetch request.

3. The apparatus of claim 2 wherein the information defining a prefetch request comprises a prefetch request number and a prefetch request size.

4. The apparatus of claim 3 wherein the update mechanism computes the next address by adding the prefetch request size to the read address of the initial InfiniBand RDMA request.

5. The apparatus of claim 3 wherein the repeat mechanism generates further RDMA prefetch read requests until an amount of data equal to the prefetch request size has been retrieved.

6. The apparatus of claim 1 further comprising a data structure that stores a data tag identifying the new RDMA read request.

7. The apparatus of claim 6 wherein the data structure is referenced in the new RDMA read request.

8. The apparatus of claim 1 wherein the repeat mechanism generates the new RDMA read request on a work queue used to generate the initial RDMA read request.

9. The apparatus of claim 1 wherein the data returning from an RDMA read request comprises a plurality of data packets.

10. The apparatus of claim 1 wherein the update mechanism comprises an address map that computes the read address of the initial InfiniBand RDMA request from a PCI address.

11. The apparatus of claim 10 wherein the address map includes an R-key that that is associated with an area in a memory from which DMA data is retrieved and a pointer to a work queue that generates the initial InfiniBand RDMA request.

12. The apparatus of claim 11 wherein the repeat mechanism generates a new read address for an RDMA read request by combining the PCI address with the R-Key and the next address.

13. A method for performing speculative prefetching for a PCI DMA read request in a PCI-InfiniBand bridge system, the method comprising:
   (a) in response to data returning from an initial InfiniBand RDMA request issued to satisfy the PCI DMA read request, computing a next address from the read address of the initial InfiniBand RDMA request; and
   (b) generating a new RDMA read request using the next address to perform a speculative prefetch.

14. The method of claim 13 wherein step (b) comprises computing the next address from information defining a prefetch request.

15. The method of claim 14 wherein the information defining a prefetch request comprises a prefetch request number and a prefetch request size.

16. The method of claim 15 wherein step (a) comprises computing the next address by adding the prefetch request size to the read address of the initial InfiniBand RDMA request.

17. The method of claim 15 wherein step (b) comprises generating further RDMA prefetch read requests until an amount of data equal to the prefetch request size has been retrieved.

18. The method of claim 13 further comprising (c) storing a data tag identifying the new RDMA read request in a data structure.

19. The method of claim 18 wherein the data structure is referenced in the new RDMA read request.

20. The method of claim 13 wherein step (b) comprises generating the new RDMA read request on a work queue used to generate the initial RDMA read request.

21. The method of claim 13 wherein the data returning from an RDMA read request comprises a plurality of data packets.

22. The method of claim 13 wherein the step (a) comprises using an address map to compute the read address of the initial InfiniBand RDMA request from a PCI address.

23. The method of claim 22 wherein the address map includes an R-key that that is associated with an area in a memory from which DMA data is retrieved and a pointer to a work queue that generates the initial InfiniBand RDMA request.

24. The method of claim 23 wherein step (b) comprises generating a new read address for an RDMA read request by combining the PCI address with the R-Key and the next address.

25. Apparatus for performing speculative prefetching for a PCI DMA read request in a PCI-InfiniBand bridge system, the apparatus comprising:

means responsive to data returning from an initial InfiniBand RDMA request issued to satisfy the PCI DMA read request for computing a next address from the read address of the initial InfiniBand RDMA request; and means for generating a new RDMA read request using the next address to perform a speculative prefetch.

26. The apparatus of claim 25 wherein the means for computing the next address comprises means for computing the next address from information defining a prefetch request.

27. The apparatus of claim 26 wherein the information defining a prefetch request comprises a prefetch request number and a prefetch request size.

28. The apparatus of claim 27 wherein the means for computing the next address comprise means for adding the prefetch request size to the read address of the initial InfiniBand RDMA request.

29. The apparatus of claim 27 wherein the means for generating the new RDMA read request comprises means for generating further RDMA prefetch read requests until an amount of data equal to the prefetch request size has been retrieved.

30. The apparatus of claim 25 wherein the means for generating the new RDMA read request comprises means for generating the new RDMA read request on a work queue used to generate the initial RDMA read request.

\* \* \* \* \*